(12) United States Patent
Park et al.

(10) Patent No.: US 11,165,366 B2
(45) Date of Patent: Nov. 2, 2021

(54) SYSTEM AND METHOD FOR CONTROLLING CONSTANT POWER GENERATION OF PHOTOVOLTAIC SYSTEM

(71) Applicant: Industry-Academic Cooperation Foundation, Yonsei University, Seoul (KR)

(72) Inventors: Jungwook Park, Seoul (KR); Hyoungkyu Yang, Seoul (KR)

(73) Assignee: Industry-Academic Cooperation Foundation, Yonsei University, Seoul (KR)

(*) Notice: Subject to any disclaimer, the term of this patent is extended or adjusted under 35 U.S.C. 154(b) by 0 days.

(21) Appl. No.: 16/938,164

(22) Filed: Jul. 24, 2020

(65) Prior Publication Data
US 2021/0159810 A1 May 27, 2021

(30) Foreign Application Priority Data
Nov. 21, 2019 (KR) .................. 10-2019-0150546

(51) Int. Cl.
*H02M 7/53846* (2007.01)
*H02S 40/32* (2014.01)
(Continued)

(52) U.S. Cl.
CPC ........ *H02M 7/538466* (2013.01); *G05F 1/67* (2013.01); *H02J 11/00* (2013.01);
(Continued)

(58) Field of Classification Search
CPC .... G05F 1/66; G05F 1/67; H02M 3/156–158; H02M 1/007; H02M 7/537;
(Continued)

(56) References Cited

U.S. PATENT DOCUMENTS 3,489,915 A * 1/1970 Engelhardt ............... G05F 1/67
307/66
4,404,472 A * 9/1983 Steigerwald ............. G05F 1/67
307/46
(Continued)

FOREIGN PATENT DOCUMENTS

CN 105974995 * 9/2016

*Primary Examiner* — Thienvu V Tran
*Assistant Examiner* — Nusrat Quddus
(74) *Attorney, Agent, or Firm* — Paratus Law Group, PLLC

(57) ABSTRACT

Disclosed is an apparatus including: a photovoltaic panel; a CPG controller configured to receive a limit output power value of a photovoltaic panel, a photovoltaic panel terminal voltage, and a photovoltaic panel output current and output a photovoltaic panel terminal voltage reference; a direct current (DC)-voltage controller configured to receive the photovoltaic panel terminal voltage reference and the photovoltaic panel terminal voltage and output a duty ratio to cause an error between these values to become zero; a pulse width modulation (PWM) control signal generator configured to receive the duty ratio and output a PWM signal to control a DC/DC converter connected to the photovoltaic panel; the DC/DC converter configured to receive the PWM signals and perform CPG control; and a DC/AC inverter connected to the DC/DC converter and configured to convert DC power into AC power and output the AC power to an electrical grid.

5 Claims, 7 Drawing Sheets

(51) Int. Cl.
*G05F 1/67* (2006.01)
*H02J 11/00* (2006.01)
*H02M 1/084* (2006.01)
*H02M 3/156* (2006.01)
*H02M 1/00* (2006.01)

(52) U.S. Cl.
CPC ........... *H02M 1/084* (2013.01); *H02M 3/156* (2013.01); *H02S 40/32* (2014.12); *H02J 2300/26* (2020.01); *H02M 1/0012* (2021.05); *H02M 1/0022* (2021.05)

(58) Field of Classification Search
CPC .......... H02M 7/5387; H02J 3/38; H02J 3/381; H02J 3/388; H02J 2300/26; H02S 40/32
See application file for complete search history.

(56) References Cited

U.S. PATENT DOCUMENTS

| | | | | | |
|---|---|---|---|---|---|
| 5,892,354 | A * | 4/1999 | Nagao | ............... | G05F 1/67 323/299 |
| 5,923,100 | A * | 7/1999 | Lukens | ............... | G05F 1/67 307/66 |
| 6,046,919 | A * | 4/2000 | Madenokouji | ............... | G05F 1/67 363/98 |
| 6,433,522 | B1 * | 8/2002 | Siri | ............... | H02J 3/383 323/272 |
| 8,279,644 | B2 * | 10/2012 | Zhang | ............... | G05F 1/67 363/55 |
| 8,339,112 | B2 * | 12/2012 | Rua | ............... | H02J 7/35 323/222 |
| 8,767,421 | B2 * | 7/2014 | Chapman | ............... | H02M 7/48 363/39 |
| 9,154,032 | B1 * | 10/2015 | Beijer | ............... | H02M 3/156 |
| 9,225,256 | B2 * | 12/2015 | Chapman | ............... | H02M 5/458 |
| 9,436,201 | B1 * | 9/2016 | Teirelbar | ............... | H02J 3/381 |
| 10,868,422 | B1 * | 12/2020 | Jia | ............... | H02S 40/34 |
| 2005/0073289 | A1 * | 4/2005 | Takada | ............... | H01M 8/0488 323/282 |
| 2005/0252546 | A1 * | 11/2005 | Sasaki | ............... | H02S 40/38 136/243 |
| 2007/0024257 | A1 * | 2/2007 | Boldo | ............... | G05F 1/67 323/282 |
| 2008/0179949 | A1 * | 7/2008 | Besser | ............... | H02J 7/0068 307/24 |
| 2009/0302681 | A1 * | 12/2009 | Yamada | ............... | H02J 3/383 307/46 |
| 2010/0117623 | A1 * | 5/2010 | Fife | ............... | G05F 1/67 324/76.11 |
| 2010/0156185 | A1 * | 6/2010 | Kim | ............... | H02J 3/383 307/72 |
| 2010/0207455 | A1 * | 8/2010 | Erickson, Jr. | ............... | H02S 40/34 307/82 |
| 2010/0236612 | A1 * | 9/2010 | Khajehoddin | ............... | H02M 7/48 136/252 |
| 2011/0140520 | A1 * | 6/2011 | Lee | ............... | H01L 31/02021 307/25 |
| 2011/0301790 | A1 * | 12/2011 | Atluri | ............... | B60L 1/08 701/22 |
| 2012/0026769 | A1 * | 2/2012 | Schroeder | ............... | H02J 3/381 363/131 |
| 2012/0080943 | A1 * | 4/2012 | Phadke | ............... | H02J 3/381 307/24 |
| 2012/0081088 | A1 * | 4/2012 | Park | ............... | H02J 7/345 323/282 |
| 2012/0081934 | A1 * | 4/2012 | Garrity | ............... | H02J 3/385 363/37 |
| 2012/0081937 | A1 * | 4/2012 | Phadke | ............... | H02M 7/17 363/95 |
| 2012/0105041 | A1 * | 5/2012 | Lin | ............... | G05F 1/67 323/285 |
| 2012/0127764 | A1 * | 5/2012 | Phadke | ............... | H02M 7/4807 363/37 |
| 2012/0139489 | A1 * | 6/2012 | Gaul | ............... | H02J 7/00036 320/109 |
| 2012/0205974 | A1 * | 8/2012 | McCaslin | ............... | H02J 3/381 307/18 |
| 2012/0268970 | A1 * | 10/2012 | Lee | ............... | H02M 1/32 363/21.12 |
| 2013/0094261 | A1 * | 4/2013 | Kern | ............... | H02M 7/5387 363/98 |
| 2013/0155739 | A1 * | 6/2013 | Itako | ............... | G05F 1/67 363/95 |
| 2014/0077608 | A1 * | 3/2014 | Nosaka | ............... | H02J 3/385 307/77 |
| 2014/0306540 | A1 * | 10/2014 | Wu | ............... | H02J 3/385 307/77 |
| 2014/0333141 | A1 * | 11/2014 | Hu | ............... | H02M 7/4807 307/84 |
| 2014/0334202 | A1 * | 11/2014 | Cameron | ............... | H02J 3/00 363/56.01 |
| 2015/0009733 | A1 * | 1/2015 | Takaki | ............... | H02M 7/537 363/97 |
| 2015/0021998 | A1 * | 1/2015 | Trescases | ............... | H02J 3/381 307/46 |
| 2015/0092462 | A1 * | 4/2015 | Ohori | ............... | H02M 7/44 363/71 |
| 2015/0236599 | A1 * | 8/2015 | Park | ............... | H02M 1/08 363/21.17 |
| 2016/0181944 | A1 * | 6/2016 | James | ............... | B60L 55/00 363/17 |
| 2016/0226253 | A1 * | 8/2016 | Abido | ............... | H02J 3/381 |
| 2017/0214337 | A1 * | 7/2017 | Baronian | ............... | H02J 3/385 |
| 2018/0006580 | A1 * | 1/2018 | Lung | ............... | H02M 5/04 |
| 2019/0334377 | A1 * | 10/2019 | Abe | ............... | H02M 3/158 |
| 2020/0153336 | A1 * | 5/2020 | Mihai | ............... | H02M 1/32 |
| 2020/0212823 | A1 * | 7/2020 | Gong | ............... | H02J 3/38 |
| 2020/0251907 | A1 * | 8/2020 | Hester | ............... | H02S 40/30 |
| 2020/0280183 | A1 * | 9/2020 | Yamashita | ............... | H02J 1/12 |
| 2020/0403412 | A1 * | 12/2020 | Kang | ............... | H02J 3/381 |
| 2021/0098993 | A1 * | 4/2021 | Shi | ............... | H02M 1/00 |
| 2021/0119454 | A1 * | 4/2021 | Xu | ............... | H02J 3/38 |

* cited by examiner

SYSTEM AND METHOD FOR CONTROLLING CONSTANT POWER GENERATION OF PHOTOVOLTAIC SYSTEM

ACKNOWLEDGEMENT

This work was supported by National Research Foundation of Republic of Korea (NRF) grant funded by Ministry of Science and ICT (MIST), Korea government (No. 2020R1A3B2079407).

CROSS-REFERENCE TO RELATED APPLICATION

This application claims priority under 35 U.S.C. § 119 to Korean Application No. 10-2019-0150546 (filed on Nov. 21, 2019), which is hereby incorporated by reference in its entirety.

BACKGROUND

The present disclosure relates to a photovoltaic system, and more particularly, to an apparatus and method for constant power generation control of a photovoltaic system, in which an output power may be maintained to be constant at a high response rate through real-time constant power point (CPP) tracking according to a constant power generation control method under a condition in which solar irradiance rapidly changes.

In general, photovoltaic systems are capable of generating eco-friendly power energy from infinite solar energy, do not cause vibration and noise, and have a semi-permanent lifespan.

In addition, photovoltaic systems are easy to install and automate and thus costs of operation and maintenance thereof can be minimized.

To increase power generation efficiency of photovoltaic systems, it is necessary to perform control to extract a maximum amount of power from a solar cell array or a solar module.

Maximum power point tracking (MPPT) control is a control method of controlling a solar module to track a maximum power point as an operating point.

Representative examples of methods of controlling a maximum power point (MPP) of a solar cell include a Perturbation and Observation (P&O) control method, an Incremental Conductance (IC) control method, a Constant Voltage (CV) control method, and the like.

Power generation of photovoltaic systems that are supplied with solar energy and generate power from the solar energy is concentrated in a specific time period when the intensity of solar energy is strong.

Therefore, in the case of an electrical grid in which a percentage of power generation of photovoltaic systems is high, there is a risk of an overload phenomenon in a specific time period in which power supply exceeds power demand.

In this case, in order to prevent the overload phenomenon, the amount of power generation of other power generators should be controlled drastically, which may adversely affect stable power supply and increase costs of operating the electrical grid.

To operate the electrical grid stably and economically, it is necessary to perform constant power generation (CPG) control for constantly controlling an output power of a photovoltaic system.

A Perturbation & Observation-CPG (P&O-CPG) method is a representative example of a CPG control method of a photovoltaic system of the related art.

FIG. 1 is a characteristic graph showing a constant power point (CPP) tracking process based on the P&O-CPG method of the related art. FIG. 2 is a flowchart of the CPP tracking process based on the P&O-CPG method of the related art.

In the CPP tracking method as illustrated in FIG. 1, when a limit output power value $P_{limit}$ of a photovoltaic panel is input, the limit output power value $P_{limit}$ is compared with a current output power value $P_{pv}$ of the photovoltaic panel. General maximum power point tracking (MPPT) control is performed when the current output power value $P_{pv}$ is less than the limit output power value $P_{limit}$ and a photovoltaic panel terminal voltage reference $v_{pv}^*$ is reduced by a voltage step $v_{step}$ when the current output power value $P_{pv}$ is greater than the limit output power value $P_{limit}$.

That is, in the voltage step-based CPG control method of the related art, when the current output power value $P_{pv}$ is greater than the limit output power value $P_{limit}$, a voltage to be tracked is calculated by Equation 1 below and an algorithm is performed at unit time intervals.

$$v_{pv}^*(k) = v_{pv}^*(k-1) - v_{step} \qquad \text{[Equation 1]}$$

Therefore, when P&O-CPG is performed, an operating point of photovoltaic panel converges to a CPP and thus an output power of a photovoltaic system is maintained to be constant.

However, in the case of P&O-CPG, a CPP tracking speed is high but oscillations may occur around the CPP when $v_{step}$ is large, whereas the oscillations around the CPP is small but the CPP tracking speed is low when $v_{step}$ is small.

That is, the voltage step-based CPG control method of the related art is disadvantageous in that a CPP convergence speed is low, severe oscillations occur around a CPP, and a constant output power cannot be maintained due to a low response rate when solar irradiance changes.

Accordingly, there is a need to develop a new CPG control method to maintain a constant output power even at a high response rate even when solar irradiance rapidly changes.

SUMMARY

To address the above problem of a photovoltaic system of the related art, the present disclosure is directed to providing an apparatus and method for constant power generation (CPG) control of a photovoltaic system, in which an output power can be maintained to be constant at a high response rate through real-time constant power point (CPP) tracking according to a CPG control method under a condition in which solar irradiance rapidly changes.

The present disclosure is directed to providing an apparatus and method for CPG control of a photovoltaic system, in which a photovoltaic panel terminal voltage reference $v_{pv}^*$ can be estimated very close to a CPP voltage for fast convergence to a CPP even when the distance between an operating point of photovoltaic panel and a CPP is large.

The present disclosure is directed to providing an apparatus and method for CPG control of a photovoltaic system, in which a voltage step $v_{step}$ is not used to prevent oscillations around CPP, thereby accurately achieving a desired output power value.

The present disclosure is directed to providing an apparatus and method for CPG control of a photovoltaic system, which are capable of efficiently managing the amount of power generation concentrated in a specific time period to improve penetration level of the photovoltaic system in an electrical grid and effectively prevent the overload phenomenon.

Aspects of the present disclosure are not limited thereto and other aspects not mentioned here will be clearly understood by those of ordinary skill in the art from the following description.

According to an aspect of the present disclosure, an apparatus for constant power generation (CPG) control of a photovoltaic system includes a photovoltaic panel; a CPG controller configured to receive a limit output power value $P_{limit}$ of a photovoltaic panel, a photovoltaic panel terminal voltage $v_{pv}$, and a photovoltaic panel output current $i_{pv}$ and output a photovoltaic panel terminal voltage reference $v_{pv}*$; a direct current (DC)-voltage controller configured to receive the photovoltaic panel terminal voltage reference $v_{pv}*$ and the photovoltaic panel terminal voltage $v_{pv}$ and output a duty ratio D to cause an error between these values to become zero; a pulse width modulation (PWM) control signal generator configured to receive the duty ratio D and output a PWM signal to control a DC/DC converter connected to the photovoltaic panel; the DC/DC converter configured to receive the PWM signal and perform CPG control; and a DC/alternating current (AC) inverter connected to the DC/DC converter and configured to convert DC power into AC power to use the DC power as commercial power and output the AC power to an electrical grid, wherein a straight line is drawn from an operating point of photovoltaic panel to an origin to find an intersection with a line $P_{limit}$, a voltage value $v_{pv}*(A)$ of the intersection is set to a photovoltaic panel terminal voltage reference $v_{pv}*$, and the voltage value $v_{pv}*(A)$ of the intersection is tracked as the photovoltaic panel terminal voltage $v_{pv}$, thereby causing the operating point of photovoltaic panel to converge to a constant power point (CPP).

According to another aspect of the present disclosure, a method of constant power generation (CPG) control of a photovoltaic system includes comparing a limit output power value $P_{limit}$ of a photovoltaic panel with a current output power value $P_{pv}$ of the photovoltaic panel; performing maximum power point tracking (MPPT) control according to a result of the comparing or estimating a constant power point (CPP) voltage in real time; drawing a straight line from an operating point of photovoltaic panel to an origin to find an intersection of a line $P_{limit}$ and setting a voltage value $v_{pv}*(A)$ of the intersection to a photovoltaic panel terminal voltage reference $v_{pv}*$, and reducing a photovoltaic panel terminal voltage $v_{pv}$ to follow the voltage value $v_{pv}*(A)$ of the intersection through operation of a DC-voltage controller, and calculating and tracking a new photovoltaic panel terminal voltage reference $v_{pv}*(B)$ in real time, thereby causing the operating point of photovoltaic panel to converge to a CPP.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION

Hereinafter, apparatuses and methods for constant power generation (CPG) control of a photovoltaic system according to embodiments of the present disclosure will be described in detail.

Features and advantages of the apparatuses and methods for CPG control of a photovoltaic system according to the present disclosure will become apparent from a detailed description of embodiments to be described below.

Figure 1:
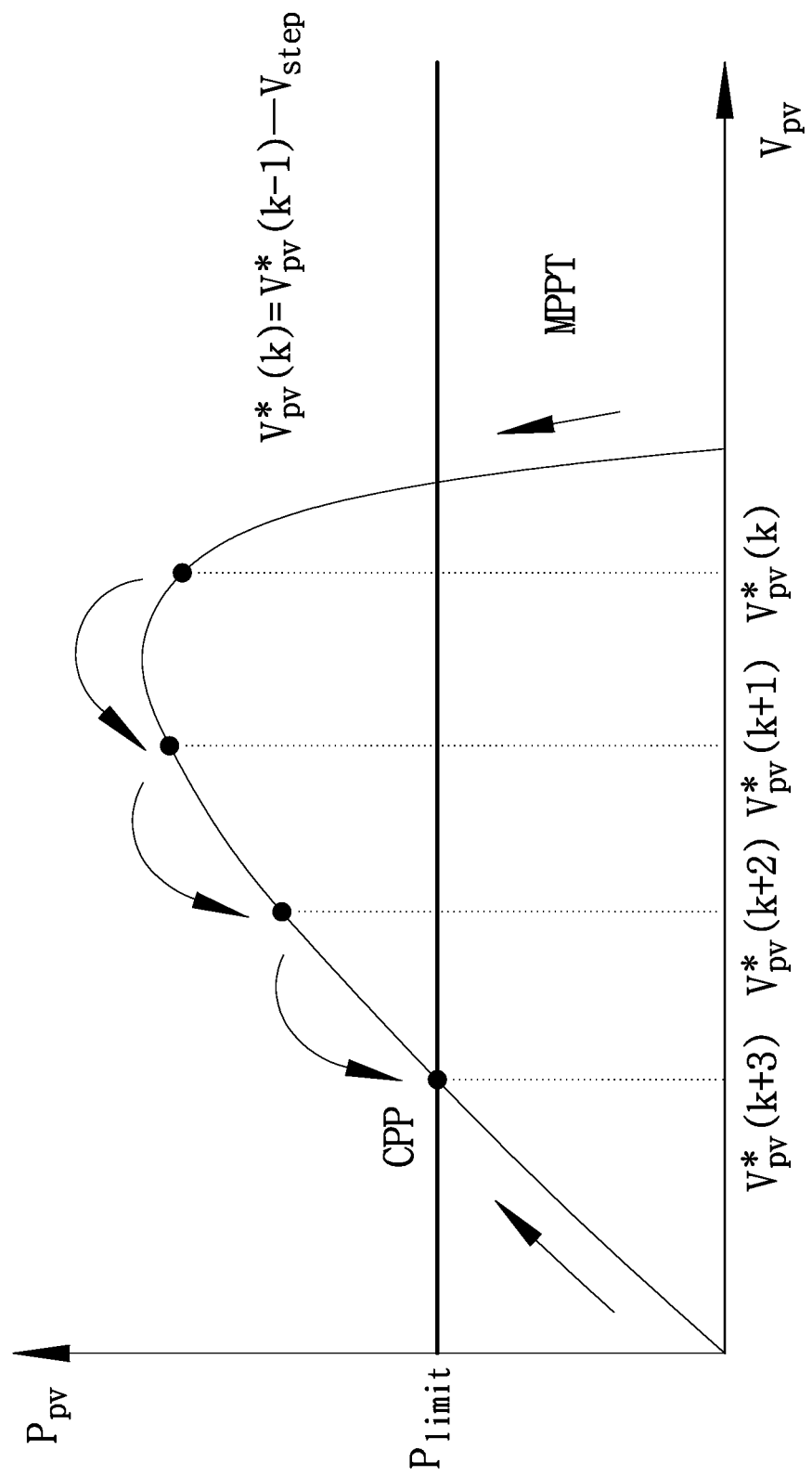
FIG. 1 is a characteristic graph showing a constant power point (CPP) tracking process based on a P&O-CPG method of the related art.
Figure 2:
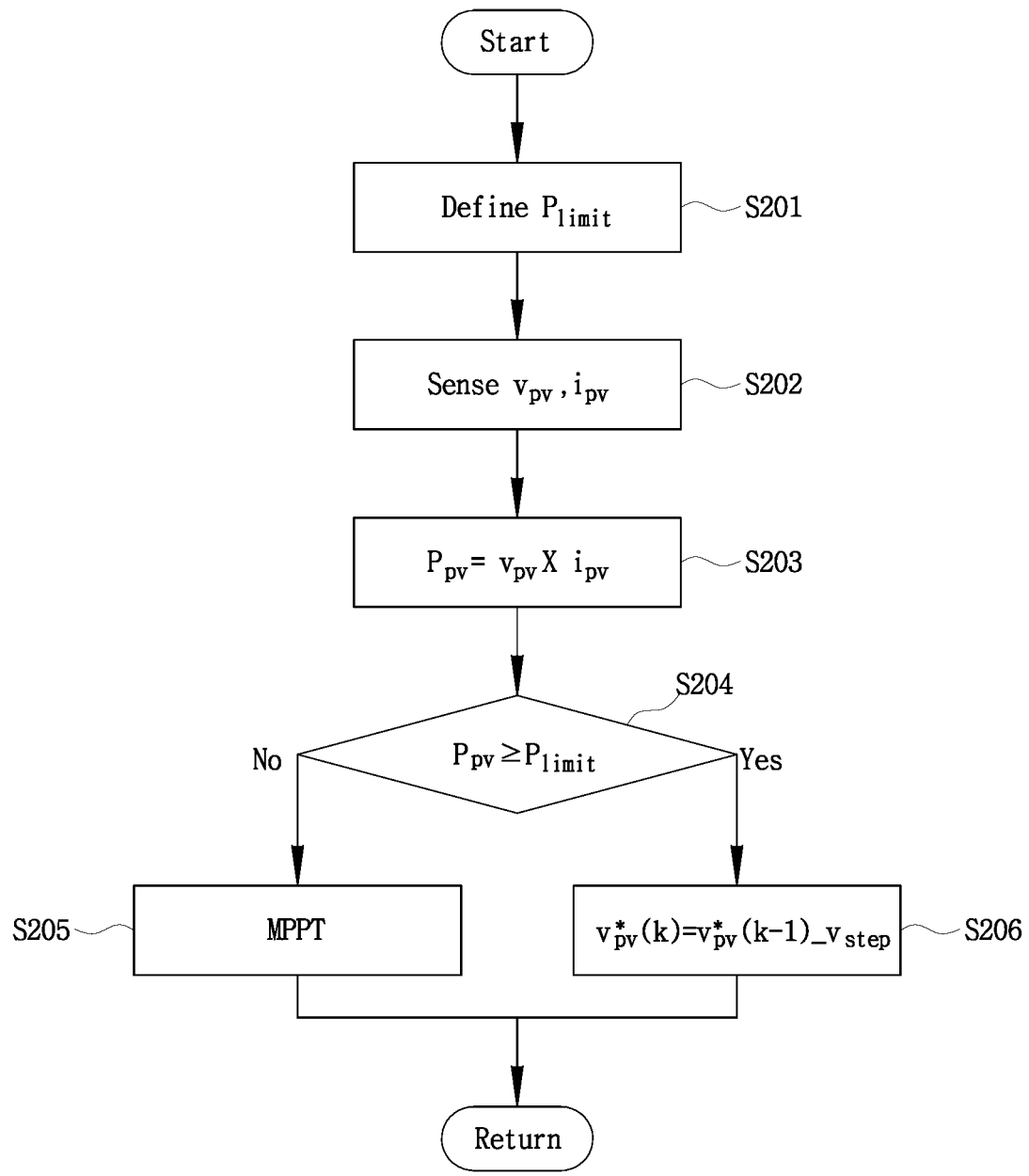
FIG. 2 is a flowchart of the CPP tracking process based on the P&O-CPG method of the related art.
Figure 3:
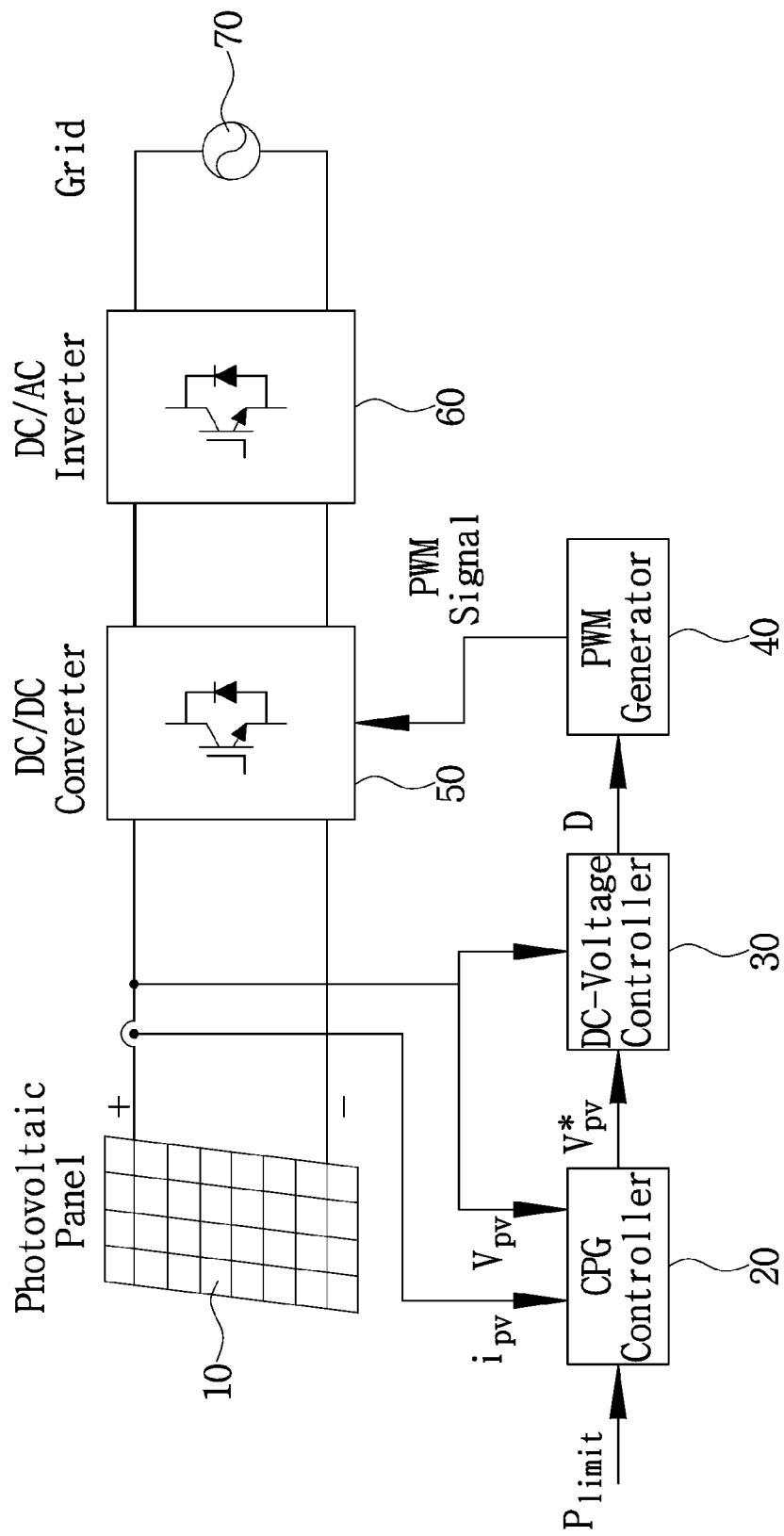
FIG. 3 is a configuration diagram of an apparatus for constant power generation (CPG) control of a photovoltaic system according to an embodiment of the present disclosure.

FIG. 3 is a configuration diagram of an apparatus for CPG control of a photovoltaic system according to an embodiment of the present disclosure.

To improve penetration level of the photovoltaic system in an electrical grid and prevent the overload phenomenon, it is necessary to limit the amount of power generation concentrated in a specific time period.

By applying an apparatus and method for CPG control of a photovoltaic power generation system according to the present disclosure, it is possible to rapidly converge to a CPP and thus an output power does not exceed a limit output power value. Thus, it is not necessary to rapidly control output powers of other generators and thus stable and economical operation of an electrical grid can be expected.

In addition, oscillations does not occur around a CPP and thus high reliability of the photovoltaic system can be expected, and an output power can be maintained to be constant at a high response rate when solar irradiance rapidly changes. Thus, not only high reliability but also a large amount of power generation can be expected, thereby securing economic feasibility of the photovoltaic system.

To this end, as illustrated in FIG. 3, the apparatus for CPG control of a photovoltaic system according to an embodiment of the present disclosure includes a photovoltaic panel 10, a CPG controller 20 which receives a limit output power value $P_{limit}$ of the photovoltaic panel 10, a photovoltaic panel terminal voltage $v_{pv}$, a photovoltaic panel output current $i_{pv}$ and outputs a photovoltaic panel terminal voltage reference $v_{pv}*$, a direct current (DC)-voltage controller 30 which receives the photovoltaic panel terminal voltage reference $v_{pv}*$ and the photovoltaic panel terminal voltage $v_{pv}$ and outputs a duty ratio D to cause an error between these values to be zero, a PWM control signal generator 40 which receives the duty ratio D and outputs a PWM signal to control a DC/DC converter 50, the DC/DC converter 50 which receives the PWM signal and performs CPG control, and a DC/alternating current (AC) inverter 60 which is connected to the DC/DC converter 50, converts a DC current into an AC current, and outputs the AC current to an electrical grid 70 so that the DC current may be used as commercial power.

In the apparatus and method for CPG control of a photovoltaic system according to the present disclosure, a CPG control method employing CPP voltage estimation is applied to reduce the disadvantages of the voltage step-based CPG control method.

The CPG controller 20 receives the limit output power value $P_{limit}$ of the photovoltaic panel 10, the photovoltaic panel terminal voltage $v_{pv}$, and the photovoltaic panel output current $i_{pv}$, and outputs the photovoltaic panel terminal voltage reference $v_{pv}^*$. The DC-voltage controller 30 receives the photovoltaic panel terminal voltage reference $v_{pv}^*$ and the photovoltaic panel terminal voltage $v_{pv}$ and outputs the duty ratio D so that an error between these values may be zero. The PWM control signal generator 40 receives the duty ratio D and outputs the PWM signal to control the DC/DC converter 50.

Figure 4:
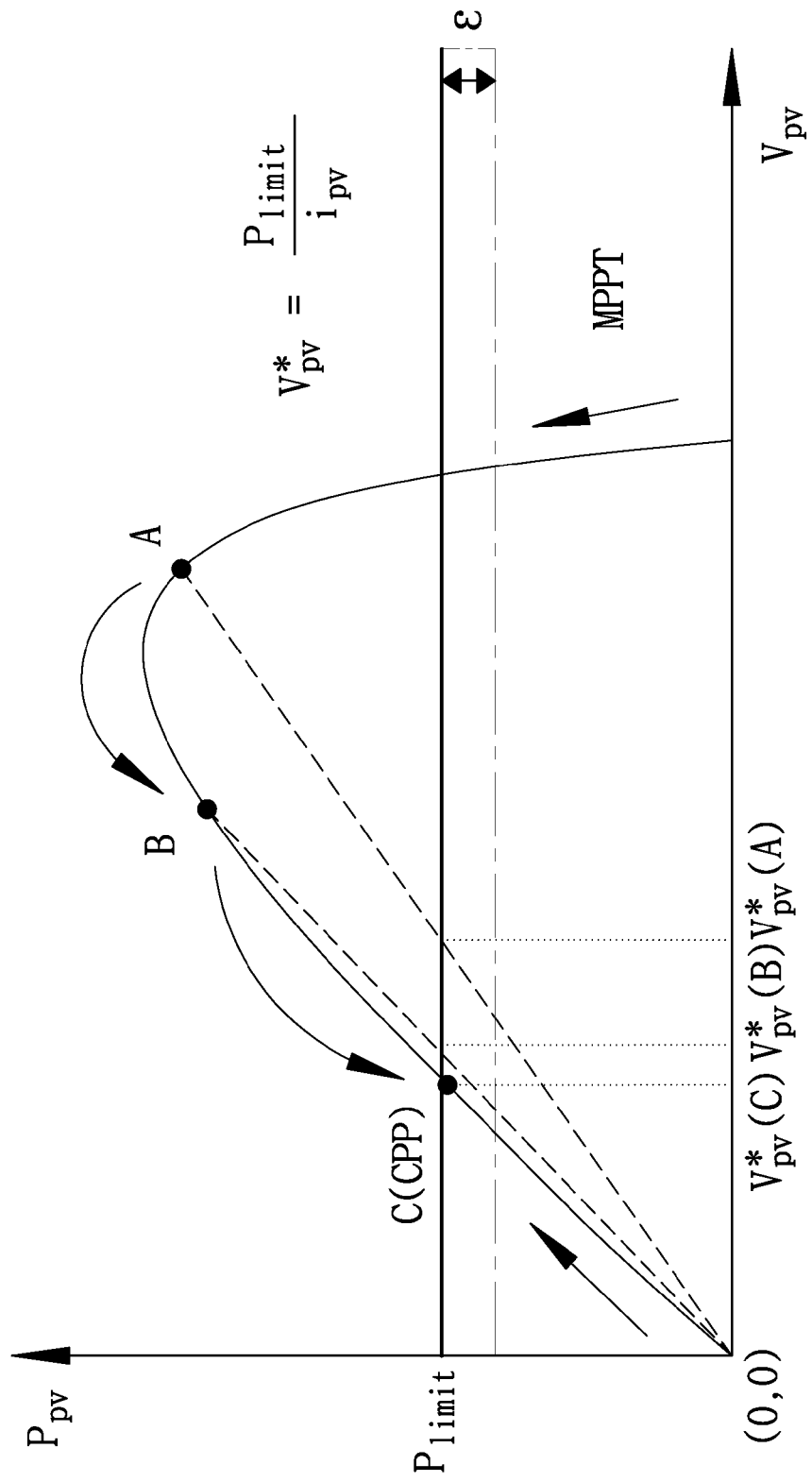
FIG. 4 is a characteristic graph showing a CPP tracking process based on a CPG control method according to an embodiment of the present disclosure.
Figure 5:
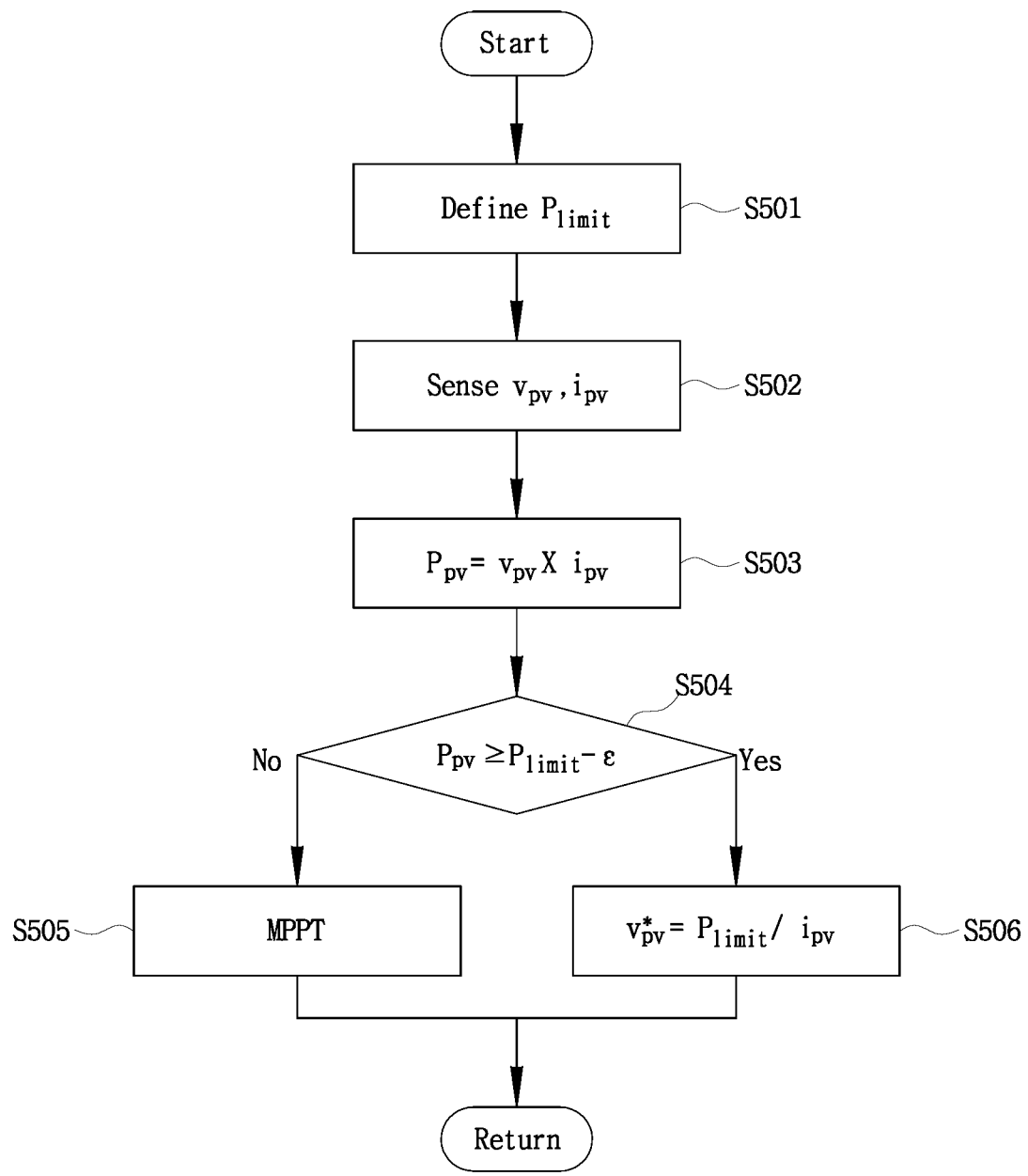
FIG. 5 is a flowchart of the CPP tracking process based on the CPG control method according to an embodiment of the present disclosure.

FIG. 4 is a characteristic graph showing a CPP tracking process based on a CPG control method according to an embodiment of the present disclosure. FIG. 5 is a flowchart of the CPP tracking process based on the CPG control method according to an embodiment of the present disclosure.

The CPP tracking process based on the CPG control method according to the present disclosure is as illustrated in FIG. 4.

The CPP tracking process based on the CPG control method according to the present disclosure includes comparing a limit output power value $P_{limit}$ of a photovoltaic panel with a current output power value $P_{pv}$ of the photovoltaic panel, performing MPPT control according to a result of the comparison or estimating a CPP voltage in real time, drawing a straight line from an operating point of photovoltaic panel to the origin to find an intersection with a $P_{limit}$ line and setting a voltage value $v_{pv}^*(A)$ of the intersection point to a photovoltaic panel terminal voltage reference $v_{pv}^*$, and reducing the terminal voltage $v_{pv}$ of the photovoltaic panel to follow the voltage value $v_{pv}^*(A)$ of the intersection through operation of a DC-voltage controller and calculating and tracking a new photovoltaic panel terminal voltage reference $v_{pv}^*(B)$ in real time so as to converge the operating point of photovoltaic panel to a CPP.

Specifically, the limit output power value $P_{limit}$ of the photovoltaic panel is compared with the current output power value $P_{pv}$ of the photovoltaic panel and general MPPT control is performed when the current output power value $P_{pv}$ is less than $(P_{limit}-\varepsilon)$. Here, F is an output power margin representing the vicinity of the CPP.

When the current output power value $P_{pv}$ is greater than $(P_{limit}-\varepsilon)$, a CPP voltage is estimated in real time.

In FIG. 4, a process of converging the operating point of photovoltaic panel to the CPP when the current output power value $P_{pv}$ is greater than $(P_{limit}-\varepsilon)$ will be described in detail below.

Assuming that the operating point of photovoltaic panel is a point A of FIG. 4, a straight line is drawn from the point A to the origin for convergence to the CPP.

In this case, because the line $P_{limit}$ is located between the current output power value $P_{pv}$ and zero, there must be an intersection with the straight line.

The voltage value $v_{pv}^*(A)$ of the intersection is set to the photovoltaic panel terminal voltage reference $v_{pv}^*$.

Through operation of the DC-voltage controller, the photovoltaic panel terminal voltage $v_{pv}$ is reduced to follow the voltage $v_{pv}^*(A)$ value of the intersection and anew reference $v_{pv}^*$ (e.g., $v_{pv}^*(B)$) is calculated and tracked during the reducing of the photovoltaic panel terminal voltage $v_{pv}$ (e.g., at a point B).

As the operating point of photovoltaic panel approximates the CPP, the voltage reference $v_{pv}^*$ calculated in real time becomes very close to the CPP voltage, and consequently, the operating point of photovoltaic panel converges to the CPP.

In this case, a formula of calculating a voltage value of an intersection of a straight line from the operating point of photovoltaic panel to the origin and the $P_{limit}$ line may be expressed as follows.

$$v_{pv}^* = \frac{P_{limit}}{P_{pv}} \cdot v_{pv} = \frac{P_{limit}}{i_{pv}} \qquad \text{[Equation 2]}$$

Figure 6:
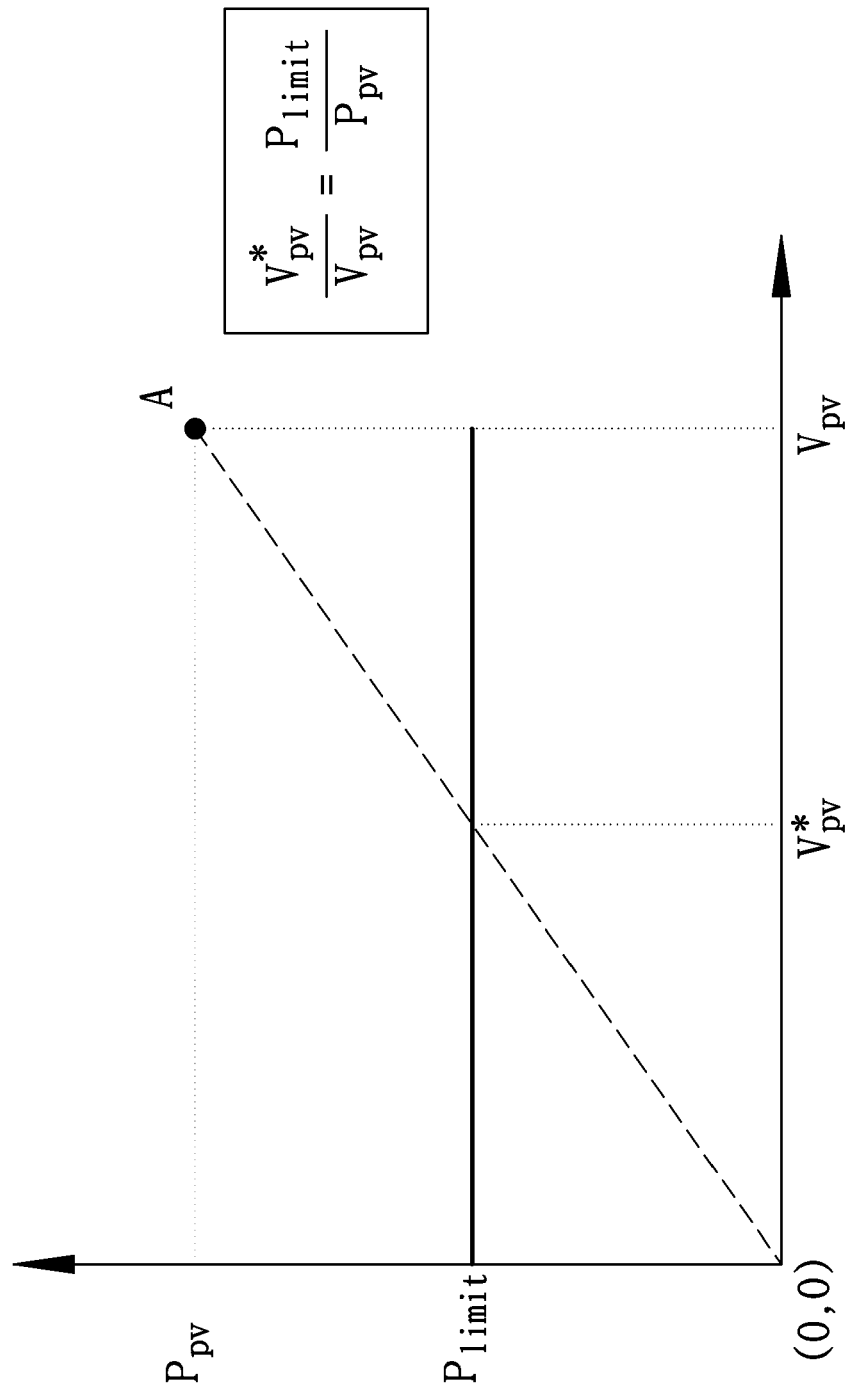
FIG. 6 is a characteristic graph showing deriving of a formula which estimates a CPP voltage according to a CPG control method according to an embodiment of the present disclosure.

Equation 2 is derived from FIG. 6.

FIG. 6 is a characteristic graph showing deriving of a formula which estimates a CPP voltage according to a CPG control method according to an embodiment of the present disclosure.

When a right-angled triangle is drawn in which an operating point of photovoltaic panel and the origin form a hypotenuse, a ratio between $v_{pv}^*$ and $v_{pv}$ and a ratio between $P_{limit}$ and $P_{pv}$ are the same.

As described above, according to the CPG control method of the present disclosure, a CPP tracking speed is high, no oscillations occur around a CPP, and an output power can be maintained to be constant at a high response rate when solar irradiance changes.

Because a left side of a P-V curve showing the relationship between an output of a photovoltaic panel and a terminal voltage passes through the origin without exception and has almost linear characteristics, the voltage reference N can be estimated very close to the CPP voltage even when the distance between the operating point of photovoltaic panel and the CPP is large.

Therefore, it is possible to rapidly converge to the CPP.

The voltage reference $v_{pv}^*$ is not changed by a voltage step $v_{step}$ around the CPP but a CPP voltage is numerically estimated and tracked and thus oscillations do not occur around the CPP.

Lastly, because the CPP voltage is estimated in real time, it is possible to rapidly respond to a sudden change in solar irradiance and thus a constant output power can be maintained regardless of the sudden change in solar irradiance.

Figure 7:
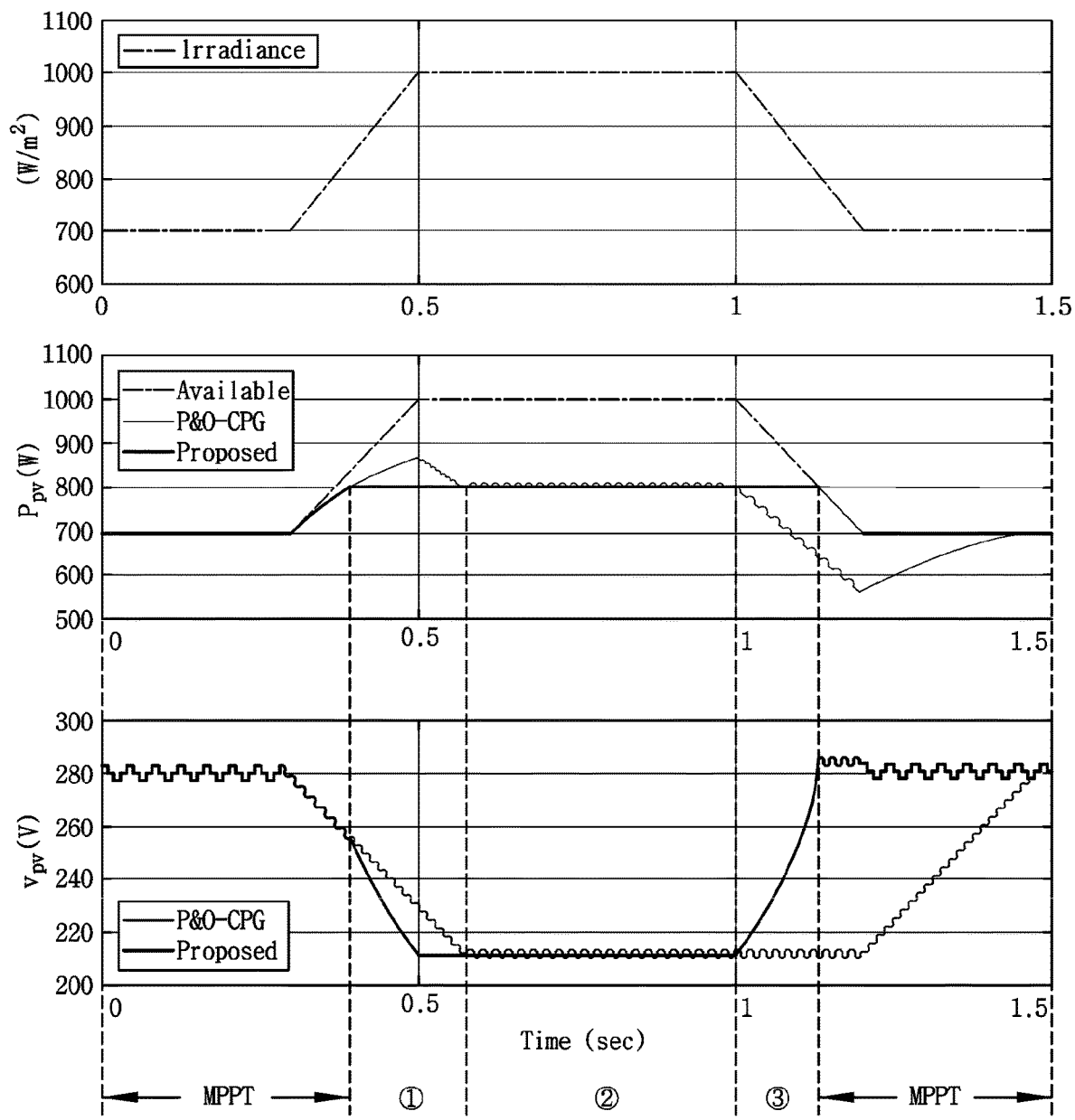
FIG. 7 is a graph comparing an output power of a photovoltaic panel and a terminal voltage according to the P&O-CPG method with those according to the CPG control method according to the present disclosure when solar irradiance rapidly changes.

FIG. 7 is a graph comparing an output power of a photovoltaic panel and a terminal voltage according to the P&O-CPG method with those according to the CPG control method according to the present disclosure when solar irradiance changes.

Solar irradiance changed with a constant slope from 700 to 1000 and to 700 W/m², $P_{limit}$ was set to 800 W, and ε was set to 5 W.

As can be seen from a $v_{pv}$ graph of FIG. 7, in the CPG control method according to the present disclosure, MPPT control was performed when $P_{pv}$ was less than $(P_{limit}-\varepsilon)$ and $v_{pv}^*$ was estimated in real time when $P_{pv}$ was greater than $(P_{limit}-\varepsilon)$.

As can be seen from a $P_{pv}$ graph, according to the P&O-CPG method, a CPP convergence speed was very low (area ①), severe oscillations occurred around a CPP (area ②), and a constant output power was not maintained due to a low response to a change in solar irradiance (area ③).

In contrast, in the CPG control method according to the present disclosure, a CPP convergence speed was very high and thus $P_{limit}$ was not exceeded (area ①), no oscillations occurred around the CPP (area ②), and an output power was maintained to be constant at a high response rate to a change in solar irradiance (area ③).

In an apparatus and method for CPG control of a photovoltaic system according to the present disclosure described above, an output power can be maintained to be constant at a high response rate through real-time CPP tracking according to the CPG control method under a condition in which solar irradiance is rapidly changing.

According to the present disclosure, a photovoltaic panel terminal voltage reference $v_{pv}^*$ can be estimated very close to a CPP voltage to rapidly converge to a CPP, and a voltage step $v_{step}$ is not used to prevent oscillations from occurring around the CPP, thereby accurately achieving a desired output power value.

The apparatus and method for CPG control of a photovoltaic system according to the present disclosure as described above has the following effects.

First, through real-time CPP tracking according to the CPG control method, an output power can be maintained to be constant at a high response rate under a condition in which solar irradiance is rapidly changing.

Second, even when the distance between an operating point of photovoltaic panel and a CPP is large, a photovoltaic panel terminal voltage reference $v_{pv}^*$ can be estimated very close to a CPP for fast convergence to the CPP.

Third, because a voltage step $v_{step}$ is not used, oscillations can be prevented from occurring around the CPP, thereby accurately achieving a desired output power value.

Fourth, it is possible to efficiently manage the amount of power generation concentrated in a specific time period, thereby improving penetration level of the photovoltaic system in an electrical grid and effectively preventing the overload phenomenon.

It will be understood that the present disclosure may be implemented in modified forms without departing from the essential characteristics of the present disclosure as described above.

Therefore, the embodiments set forth herein should be considered in a descriptive sense only and not for purposes of limitation, the scope of the present disclosure is defined not by the above description but by the appended claims, and all differences within the scope of the present disclosure should be construed as being included in the present disclosure.

What is claimed is:

1. An apparatus for constant power generation (CPG) control of a photovoltaic system, the apparatus comprising:
   a photovoltaic panel;
   a CPG controller configured to receive a limit output power value $P_{limit}$ of a photovoltaic panel, a photovoltaic panel terminal voltage $v_{pv}$, and a photovoltaic panel output current $i_{pv}$, and output a photovoltaic panel terminal voltage reference $v_{pv}^*$;
   a direct current (DC)-voltage controller configured to receive the photovoltaic panel terminal voltage reference $v_{pv}^*$ and the photovoltaic panel terminal voltage $v_{pv}$ and output a duty ratio D to cause an error between the values to become zero;
   a pulse width modulation (PWM) control signal generator configured to receive the duty ratio D and output a PWM signal to control a DC/DC converter connected to the photovoltaic panel;
   the DC/DC converter configured to receive the PWM signal and perform constant power generation control; and
   a DC/alternating current (AC) inverter connected to the DC/DC converter and configured to convert DC power into AC power to use the DC power as commercial power and output the AC power to an electrical grid,
   wherein a straight line is drawn from an operating point of photovoltaic panel to an origin to find an intersection with a line $P_{limit}$, a voltage value $v_{pv}^*(A)$ of the intersection is set to the photovoltaic panel terminal voltage reference V*pv and the voltage value V*pv(A) of the intersection is tracked as the photovoltaic panel terminal voltage $v_{pv}$, thereby causing the operating point of photovoltaic panel to converge to a constant power point (CPP),
   wherein, for convergence of the operating point of photovoltaic panel to the CPP, the limit output power value $P_{limit}$ of the photovoltaic panel is compared with a current output power value $P_{pv}$ of the photovoltaic panel, and maximum power point tracking (MPPT) control is performed according to a result of the comparison or a CPP voltage is estimated in real time,
   wherein the limit output power value $P_{limit}$ of the photovoltaic panel is compared with the current output power value $P_{pv}$ the photovoltaic panel,
   when the current output power value $P_{pv}$ less than ($P_{limit}-\varepsilon$), the MPPT control is performed, and
   when the current output power value $P_{pv}$ is greater than ($P_{limit}-\varepsilon$), the CPP voltage is estimated in real time, wherein $\varepsilon$ represents an output power margin of the CPP.

2. The apparatus of claim 1, wherein a formula of calculating a voltage value of an intersection of the straight line from the operating point of photovoltaic panel to the origin and the $P_{limit}$ line is $$v_{pv}^* = \frac{P_{limit}}{P_{pv}} \cdot v_{pv} = \frac{P_{limit}}{i_{pv}},$$

and
   when the current output power value $P_{pv}$ is greater than ($P_{limit}-\varepsilon$), a voltage to be tracked is calculated by the formula above.

3. A method of constant power generation (CPG) control of a photovoltaic system, the method comprising:
   comparing a limit output power value $P_{limit}$ of a photovoltaic panel with a current output power value $P_{pv}$ of the photovoltaic panel;
   performing maximum power point tracking (MPPT) control according to a result of the comparing or estimating a constant power point (CPP) voltage in real time;
   drawing a straight line from an operating point of photovoltaic panel to an origin to find an intersection of a line $P_{limit}$ and setting a voltage value $v_{pv}^*(A)$ of the intersection to a photovoltaic panel terminal voltage reference $v_{pv}^*$; and
   reducing a photovoltaic panel terminal voltage $v_{pv}$ to follow the voltage value $v_{pv}^*(A)$ of the intersection through operation of a direct current (DC)-voltage controller, and calculating and tracking a new photovoltaic panel terminal voltage reference $v_{pv}^*(B)$ in real time, thereby causing the operating point of photovoltaic panel to converge to a CPP.

4. The method of claim 3, wherein the limit output power value $P_{limit}$ of the photovoltaic panel is compared with the current output power value $P_{pv}$ of the photovoltaic panel, when the current output power value $P_{pv}$ is less than $(P_{limit}-\varepsilon)$, the MPPT control is performed, and when the current output power value $P_{pv}$ is greater than $(P_{limit}-\varepsilon)$, the CPP voltage is estimated in real time, wherein $\varepsilon$ represents an output margin of the CPP.

5. The method of claim 4, wherein a formula of calculating a voltage value of an intersection of the straight line from the operating point of photovoltaic panel to the origin and the $P_{limit}$ line is $$v_{pv}^* = \frac{P_{limit}}{P_{pv}} \cdot v_{pv} = \frac{P_{limit}}{i_{pv}},$$

and when the current output power value $P_{pv}$ is greater than $(P_{limit}-\varepsilon)$, a voltage to be tracked is calculated by the formula above.

* * * * *